March 10, 1959  D. T. AYERS, JR  2,876,627
BOOSTER BRAKE MECHANISM
Filed Dec. 1, 1953  4 Sheets-Sheet 1

INVENTOR
DAVID T. AYERS, JR.
John V. Phillips
ATTORNEY

INVENTOR
DAVID T. AYERS, JR.
BY John V. Phillips
ATTORNEY

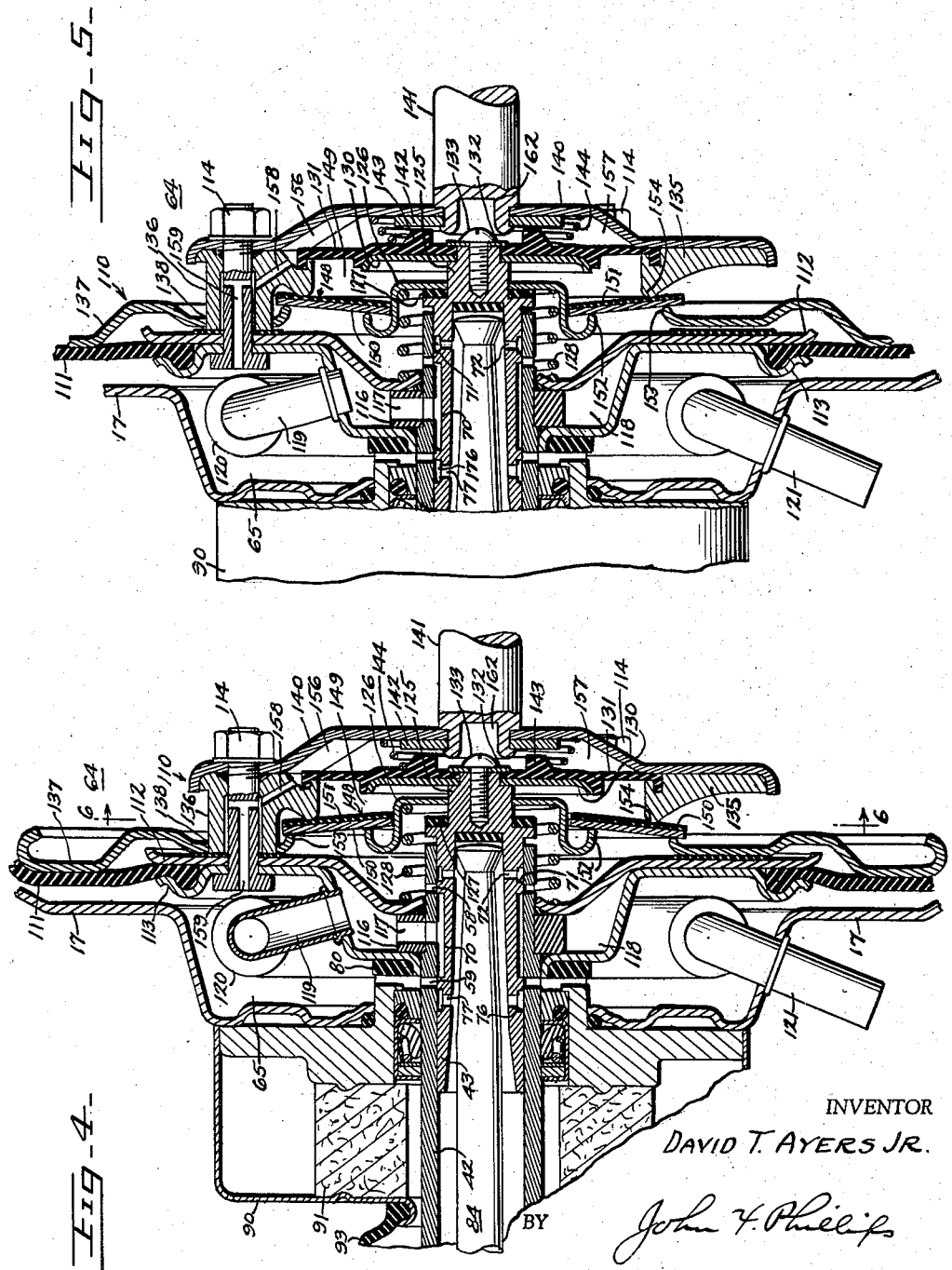

March 10, 1959 D. T. AYERS, JR 2,876,627
BOOSTER BRAKE MECHANISM
Filed Dec. 1, 1953 4 Sheets-Sheet 4
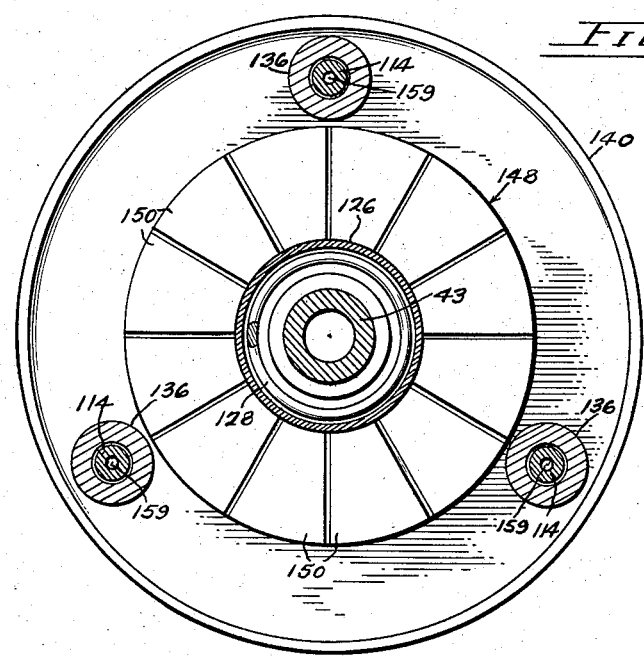
Fig-6-
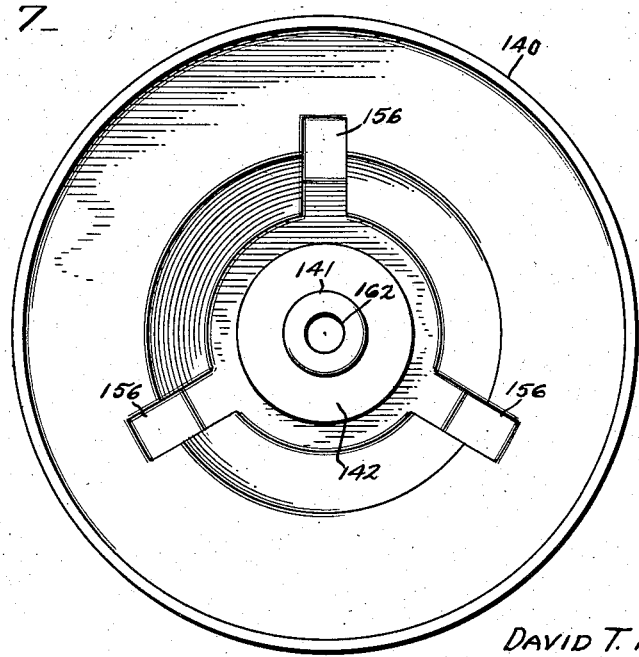
Fig-7-
INVENTOR
DAVID T. AYERS JR.
BY John V. Phillips
ATTORNEY

# United States Patent Office 2,876,627
Patented Mar. 10, 1959

2,876,627

BOOSTER BRAKE MECHANISM

David T. Ayers, Jr., Birmingham, Mich., assignor to Kelsey-Hayes Company, a corporation of Delaware Application December 1, 1953, Serial No. 395,405

16 Claims. (Cl. 60—54.6)

This invention relates to a booster brake mechanism for motor vehicles.

It has been the conventional practice to provide booster brake mechanisms of two types, namely, the type providing a single power-operated plunger projecting into the master cylinder to displace fluid therefrom, and a second type wherein the booster motor operates the fluid displacing plunger sleeve in which is arranged a pedal-operated plunger so arranged that the operator performs part of the work in displacing fluid from the master cylinder.

In the first type of device referred to, energization of the motor is utilized to react against the brake pedal to provide the latter with "feel," and in a number of these devices, the operator directly assists movement of the single plunger after the motor becomes energized to the maximum extent. In the second type referred to, fluid pressure reaction against the pedal-operated fluid displacing plunger provides the brake pedal with a highly accurate degree of "feel."

In all prior types of booster brake mechanisms of which I am aware, a booster motor is employed in which is arranged a relatively heavy return spring exerting a constant force against the pressure responsive unit of the motor, tending to return such unit to normal off position, and in such position pressures are balanced in opposite sides of the pressure responsive unit of the motor.

In some cases, the pressure responsive unit is air suspended when in off position, that is, both motor chambers are connected to the atmosphere and motor energization is effected by exhausting air from one motor chamber. Other booster brake motors are vacuum suspended when the parts are in the off positions, that is, the motors are operated by differential pressures utilizing a source of vacuum such as the intake manifold and vacuum is present on both sides of the pressure responsive unit in the off positions of the parts. Such a booster motor is energized by cutting off one motor chamber from the source of vacuum and admitting air thereinto.

In all such types of motors for booster mechanisms, the relatively heavy return spring employed for biasing the parts to off positions not only involves an appreciable item of expense but also exerts a constant force against the pressure responsive unit of the motor. Accordingly, under all brake operating conditions, a substantial percentage of the motor power is wasted in compressing the return spring, and, upon a failure of power in the booster motor, the return spring renders foot operation of the brakes more difficult. This spring also has some effect in predetermining the point of power "run-out" of the motor, that is, the point at which the motor, although fully energized, can exert no further braking forces.

An important object of the present invention is to provide a booster brake mechanism which may be of either the type employing a single fluid displacing plunger or a power-operated plunger sleeve supplemented by a pedal-operated plunger, and wherein the use of a return spring for the pressure responsive unit of the booster motor is eliminated.

A further object is to provide such a mechanism controlled by a novel type of follow-up valve device and associated elements which function, in the off positions of the parts, to maintain in the motor a sufficient differential pressure to maintain the parts in normal off positions without the use of a return spring for the pressure responsive unit of the motor.

A further object is to provide in such a mechanism a follow-up valve mechanism having spring and pressure responsive elements associated therewith so coordinated relative to the follow-up valve that when the pedal is released and the parts are in the normal off positions, the normally constant pressure chamber of the booster motor has maintained therein a pressure slightly higher than the pressure in the variable pressure chamber of the motor, thus providing automatically sufficient differential pressure to maintain the pressure responsive unit of the booster motor in off position without the use of the conventional return spring.

A further object is to provide such a device which, as stated, is applicable for use with either the type of booster employing a single fluid displacing unit, or a power-operated fluid displacing sleeve projecting into the master cylinder and supplemented by a pedal-operated fluid displacing plunger, and wherein, with either such type of motor, the pedal is provided with "feel" and the operator is enabled to add foot pressure to the power of the motor after there is a power "run-out" in the latter to assist in the final stages of brake application.

A further object is to provide such a mechanism wherein the elimination of a return spring for the pressure responsive unit of the motor permits a motor of a given capacity having given maximum differential pressures available for its operation, to utilize its power to a greater extent than in prior constructions, thus delaying the point of power "run-out," and wherein, upon a failure of booster motor power, the operator more easily may apply the brakes by foot pressure since he is relieved of the necessity of having to overcome the tension of the return spring.

Other objects and advantages of the invention will become apparent during the course of the following description.

In the drawings I have shown two embodiments of the invention. In this showing:

Figure 4 is a similar view of a modified type of booster mechanism, the parts being shown in their normal off positions;

Figure 5 is a similar view showing the valve moved to a motor energizing position;

Figure 6 is a section on line 6—6 of Figure 4; and

Figure 7 is a face view of a connecting plate and associated elements.

Figure 1:
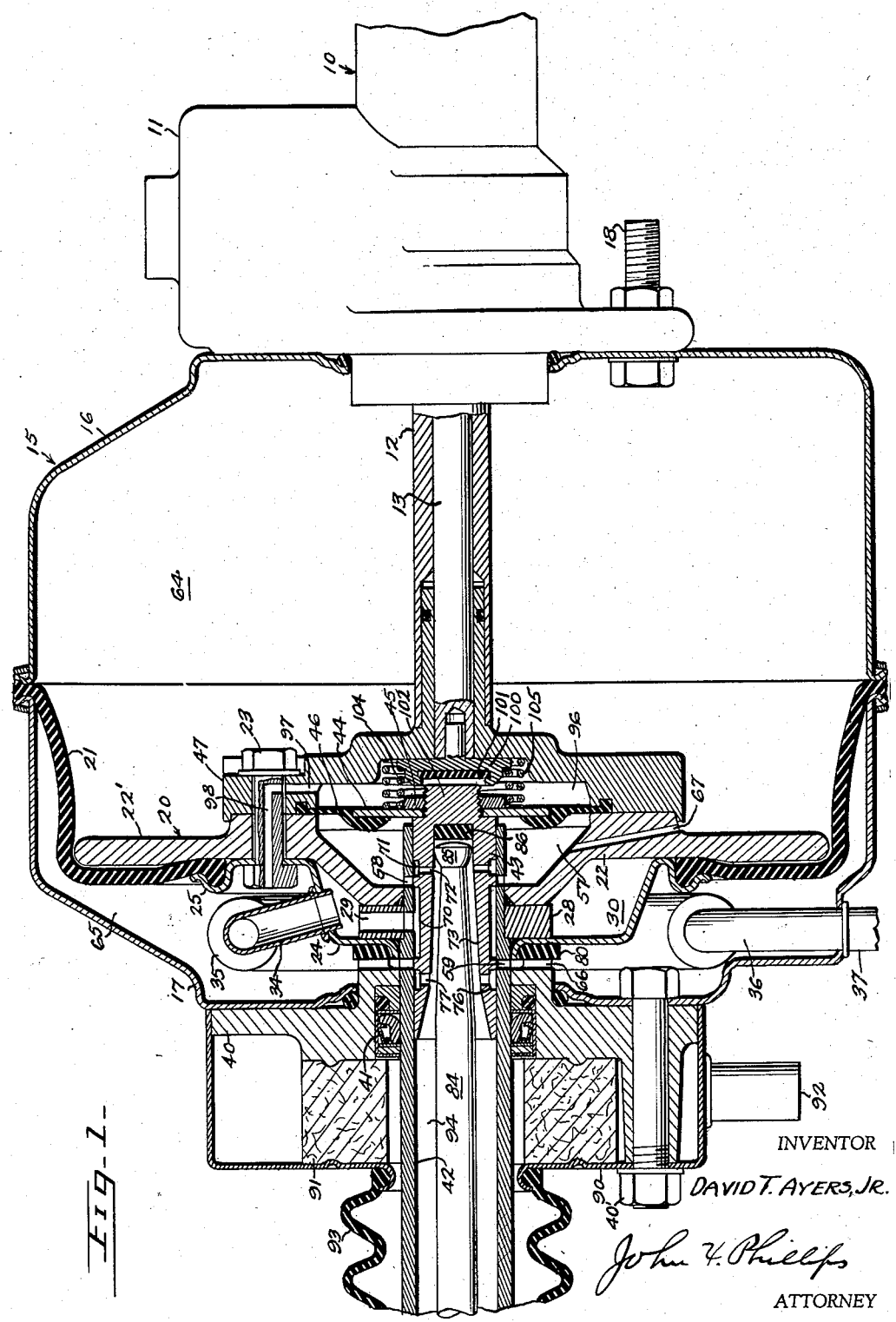
Figure 1 is an axial sectional view through a booster mechanism, parts being broken away and parts being shown in elevation, all of the parts of the mechanism being shown in their normal off positions.
Figure 2:
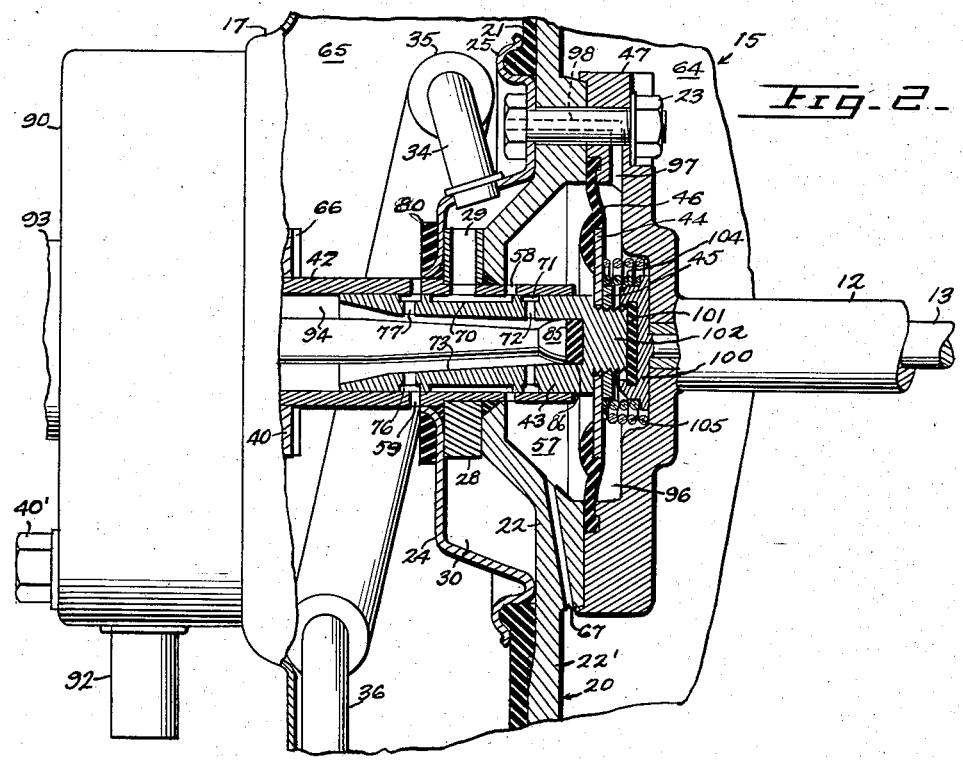
Figure 2 is a fragmentary sectional view of the same, parts being shown in elevation and the parts being shown in motor-energized positions.
Figure 3:
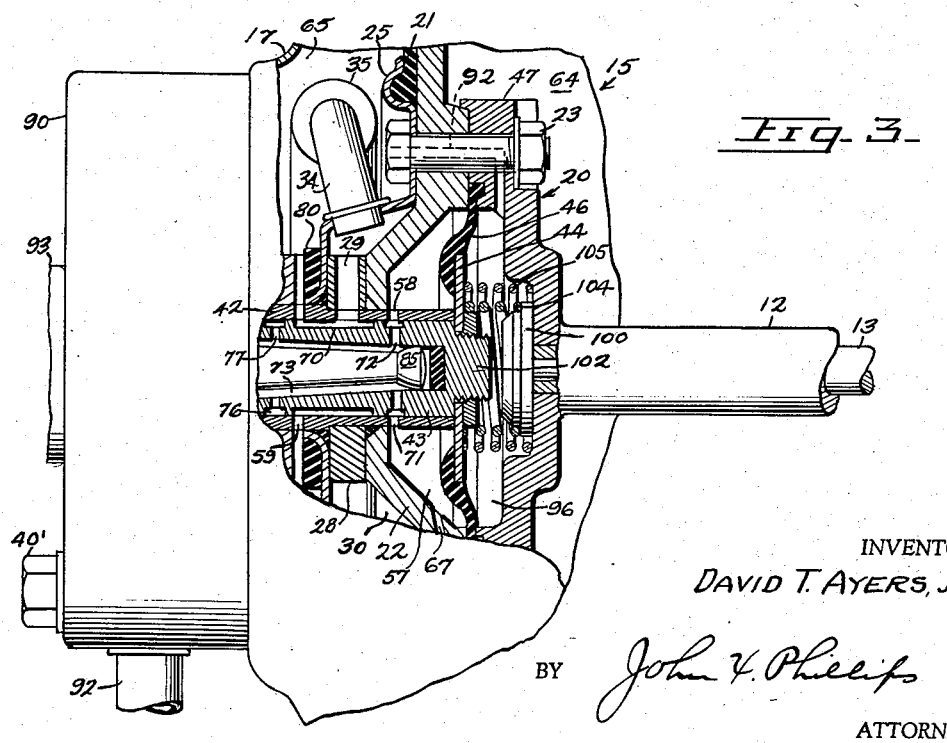
Figure 3 is a similar view showing the valve parts in position reversely to energize the motor.

Referring to Figure 1, the numeral 10 designates what is now a conventional type of master cylinder having the usual reservoir 11 associated therewith, the master cylinder being provided with an outlet leading to the wheel cylinders of the motor vehicle (not shown). In Figures 1, 2 and 3 there is shown a booster mechanism of that type which employs a power-operated fluid displacing sleeve, indicated by the numeral 12, and a pedal-operated fluid displacing plunger slidable in the sleeve and indicated by the numeral 13.

A differential fluid pressure operated motor 15 is associated with the master cylinder. This motor comprises a pair of casing sections shown in the present instance as stampings 16 and 17, the former of which is bolted as at 18 to the master cylinder.

The motor 15 comprises a pressure responsive unit indicated as a whole by the numeral 20. Such unit comprises a flexible diaphragm 21 having its outer periphery clamped between the adjacent ends of the casing sections 16 and 17 in any desired manner. The unit 20 further comprises a cast body 22 having an outstanding flange 22' against which is secured by bolts 23 a stamped plate 24 having a peripheral bead 25 receiving the inner edge of the diaphragm 21 to fix it in position relative to the body 22.

The inner peripheries of the plate 24 and body 22 are spaced from each other for the reception therebetween of a collar 28 provided with radial ports 29, and the plate 24 and body 22, outwardly of the collar 28, are spaced to provide a chamber 30 in constant communication with the ports 29.

An elbow 34 is fixed to the plate 24 as shown in Figures 1, 2 and 3 and communicates with the chamber 30. One end of a flexible hose 35 is connected to the elbow 34 and has its other end connected to an elbow 36 formed integral with a nipple 37 fixed to and projecting through the motor casing section 17 for connection with a suitable source of vacuum such as the intake manifold of the motor vehicle engine. Accordingly, it will be apparent that vacuum is always present in the chamber 30.

A bearing 40 is bolted as at 40' to the casing section 17 and carries suitable bearing and sealing means 41 through which is slidable a sleeve 42 fixed in any suitable manner to the body 22. The sleeve 42 slidably supports a valve 43 to the right-hand end of which as viewed in Figures 1, 2 and 3 is secured a disk 44 fixed in position by a nut 45 threaded on the valve 43. The disk 44 has bonded thereto a flexible diaphragm 46 the outer periphery of which is fixed to the body 22 by a plate 47 further referred to below.

The diaphragm 46 and body 22 cooperate to form a chamber 57 in fixed communication with radial ports 58 extending through the sleeve 42. This sleeve is further provided with radial ports 59 therethrough, as shown in Figures 1, 2 and 3.

The pressure responsive unit 20 divides the motor to form a pair of chambers 64 and 65, the former of which in most devices of this character is a constant pressure chamber. In the present case, the chamber 64 may be considered as a relatively constant pressure chamber and the chamber 65 as a variable pressure chamber, but as described in detail below, pressures in the chamber 64 slightly overbalance pressures in the chamber 65 in the off positions of the parts to maintain the parts in such positions. The ports 59 communicate at all times with the variable pressure chamber 65 through grooves 66 formed in the bearing body 40. The chamber 57 communicates at all times with the motor chamber 64 through a passage 67.

The valve 43 is provided with a circumferential longitudinally elongated groove 70, and the space between the remote limits of this groove substantially corresponds to the distance between the adjacent limits of the ports 58 and 59, as shown in Figure 1. To the right of the groove 70 as viewed in Figures 1, 2 and 3, the valve 43 is provided with a circumferential groove 71 communicating through radial ports 72 with the inside of the valve 43, the latter being axially recessed as at 73 for a purpose which will become apparent. Spaced from the other end of the groove 70, the valve 43 is circumferentially grooved as at 76, and such groove communicates through radial ports 77 with the axial valve recess 73.

When the parts are in the off positions shown, the projecting end of the bearing body 40 is engaged by a rubber bumper 80 bonded to the adjacent portion of the plate 24. This bumper not only limits movement of the pressure responsive unit to off position but also silences such movement, as will be apparent.

A valve actuating rod 84 is mounted in the sleeve 42 and has a head 85 arranged near the inner limit of the recess 73 and slightly spaced, in the off positions of the parts, from a cushion 86. This normal slight space is provided for the purpose of allowing for slight shifting of the valve 43 for a purpose which will become apparent.

The bolts 41 serve to fix to the bearing body 40 a shell 90 having an annular air cleaner 91 therein to which air is supplied through a nipple 92. Air flowing through the air cleaner is free to flow through a collapsible rubber or similar boot 93 secured at one end to the shell 90 and at its other end to the rod 84 beyond the end, not shown, of the sleeve 42. From the interior of the boot 93, the air flows around the end of the sleeve 42 and thence into the space 94 within the sleeve 42, and accordingly it will be apparent that atmospheric pressure is always present in the ports 72 and 77 and consequently in their associated annular grooves 71 and 76.

The space between the cap 47 and diaphragm 46 forms a chamber 96 which communicates with at least one passage 97 formed in the cap 47. At least one of the bolts 23 is provided with a passage 98 communicating between the chamber 96, through passage 97, and the motor chamber 65. Three of the bolts 23 ordinarily will be used and only one need be provided with the passage 98, as will become apparent.

The plunger 13 is provided within the cap 47 with a head 100 movable with the plunger 13, as will become apparent, and provided therewithin with a cushion washer 101 engageable under conditions to be described with the adjacent axially extended end 102 of the valve 43. A compression spring 104 is interposed between the head 100 and disk 44, and a second coil spring 105 of the same type is interposed between the disk 44 and the cap 47 for a purpose to be described.

In Figures 4–7, inclusive, a modified form of the device is shown for use with a single fluid displacing member for the master cylinder, operable by the motor. The motor, so far as the casing is concerned, and the master cylinder may be identical with the form shown in Figure 1 and need not be illustrated or referred to in detail. In the modified form of the invention, a pressure responsive unit indicated as a whole by the numeral 110 is employed and includes a diaphragm 111 which may be identical with the diaphragm 21 previously described. This diaphragm is clamped between a pair of plates 112 and 113 secured together preferably at three points by bolts 114 which may be identical with the bolts 23 previously described and further referred to below.

The plates 112 and 113 are shaped at their inner peripheries as shown in Figures 4 and 5 to receive therebetween a collar 116 having a port 117 therethrough. These plates are spaced to provide a chamber 118 in fixed communication with an elbow 119. A flexible hose 120 is connected at one end to such elbow and at its opposite end to the elbowed inner end of a nipple 121 extending through the motor casing section 17 as in the form of the invention previously described.

The collar 116 is carried by and movable with the sleeve identical with the sleeve 42, and such sleeve and the parts thereof have been indicated by the same reference numerals. Within the sleeve 42 is reciprocable a valve identical with the valve 43 (except as noted below) and such valve and its grooves and ports have been indicated by the same numerals as in Figures 1, 2 and 3. Such valve is operable by a pedal actuated rod 84, also as previously described.

The valve 43 in the modified form of the invention is provided with an axial extension 125 similar to the extension 102 in Figure 1 except that it is not externally threaded, but forms a support on which is slidable a reaction plate 126, engageable under conditions to be described with a cushion washer 127 mounted against the shoulder at the inner extremity of the extension 125. The reaction plate 126 is biased toward the right in Figures 4 and 5 by a spring 128 seated at one end against the plate 112.

Against the inner end of the valve 43 is arranged a backing plate 130 for a reaction diaphragm 131 which is bonded to such plate, and the plate and diaphragm are secured against the end of the valve by a washer 132 engaged by a screw 133 threaded in the valve.

A preferably cast ring 135 surrounds the diaphragm 131 and is provided preferably with three cylindrical bosses 136 secured with respect to the plates 112 and 113 by the bolts 114. An annular plate 137 has its outer peripheral portion engaging the diaphragm 111 and has its inner portion apertured as at 138 to receive the bosses 136 for the slidable mounting of the plate 137 relative thereto.

A force transmitting plate 140 is fixed to the ring 135 by the bolts 114 and is fixed axially thereof to a single fluid displacing member 141 extending into the master cylinder in the same manner as the sleeve 12, previously described. The plate 140 is backed up by a stiffening washer 142 engageable under conditions to be described with an annular flange 143 formed on the diaphragm 131. A compression spring 144 reacts between the plate 140 and diaphragm 131 to urge the latter toward the left to tend to impart similar movement to the valve 43.

A reaction lever device indicated as a whole by the numeral 148 is arranged in the space between the diaphragm 131 and the plate 112. It will become apparent that this lever device does not act as a seal between the spaces on opposite sides thereof, and such spaces, accordingly, may be considered to constitute a single chamber 149 which is always in communication with the valve ports 58 and corresponds to the chamber 57 shown in Figures 1, 2 and 3.

The lever device 148 is made up of a sheet steel plate cut radially to form a plurality of segments 150 maintained in fixed relation with respect to each other by a neoprene or similar backing sheet 151. This sheet is resilient and the segments 150 have their adjacent edges slightly spaced from each other, and therefore such segments are adapted to move with a reasonable degree of independence to act as lever elements in a manner to be described.

The radially inner portions of the segments 150 are engageable with an annular flange 152 formed on the plate 126. The radially outer portions of the segments are engageable with an annular flange 153 formed on the plate 137. Intermediate these annular flanges, the ring 135 is provided with an oppositely facing annular flange 154 engageable with the sheet 150.

The plate 140 bears against the ring 135 throughout the circumference thereof in sealed relation therewith, and except at the circumferentially spaced points corresponding to the location of the bolts 114, the plate 140 engages the outer periphery of the diaphragm 131 to maintain the latter in fixed position relative to the ring 135. At points circumferentially coincident with the bolts 114, the plate 140 is provided with grooves 156 affording communication between the chamber 157 and a passage 158 communicating with a passage 159, corresponding to the bolt passages 98 previously described. The chamber 157 of course is formed between the diaphragm 131 and plate 140.

The plunger 141 is provided in the end adjacent the screw 133 with an axial recess 162 to provide space for the head of the screw 133 and thus permit the diaphragm flange 143 to engage the washer 142 under conditions to be described.

*Operation*

In the form of the invention shown in Figures 1, 2, and 3, it will be apparent that the rod 84 is connected in the usual manner to the brake pedal to be actuated thereby. The parts are shown in Figure 1 in their approximate normal off positions, and the head 85 under such conditions is slightly spaced from the cushion 86. This spacing is for the purpose of permitting the valve 43 to "float" for a purpose which will become apparent. Attention is invited to the fact that no return spring is employed in the motor for biasing the pressure responsive unit to the off position shown, a slight differential pressure being maintained in the motor when it is inoperative, to hold the bumper 80 against the bearing body 40.

When the brakes are to be applied, the operator will depress the pedal against the relatively light biasing spring (not shown) which holds the pedal in normal position. A very short movement of the rod 84 will engage the head 85 with the cushion 86, thus moving the valve 43 to the right to move the valve groove 70 definitely out of communication with the ports 59 and into communication with the ports 58. Vacuum is always present in the groove 70 through ports 29, chamber 30 and flexible hose 35, the nipple 37 being connected to a source of vacuum such as the intake manifold. Whereas pressure in the motor chamber 64 will have been higher than pressure in the chamber 65 when the parts are in their normal off positions, the chamber 64 will now be connected to the source of vacuum through port 67, chamber 57, and ports 58.

Movement of the valve 43 in the manner referred to will move the valve groove 76 into communication with the ports 59, and air will flow from space 94 through ports 77, groove 76 and ports 59 into the motor chamber 65. Differential pressure will now move the pressure responsive unit to the right to effect movement of the plunger sleeve 12 into the master cylinder to displace fluid therefrom. Initial displacement of fluid from the master cylinder takes place relatively freely until the brake shoes engage the drums, as is well known. The movement of the valve referred to will take place with the spring 104 maintaining the head 100 against the cap 47, the gap between the valve end 102 and pad 101 remaining open during this period.

It will be apparent that pressures in the motor chamber 64 will coincide with pressures in the chamber 57, these chambers being connected by passage 67. A drop in pressure incident to the starting of the motor, accordingly, will affect the diaphragm 46. Pressures in the chamber 96 at the opposite side of the diaphragm will duplicate pressures in the motor chamber 65 through passages 97 and 98. Therefore, higher pressures will exist in the chamber 96 than in the chamber 57, and the differential pressure affecting the diaphragm 46 will oppose movement of the valve 43 toward the right to an extent proportional to energization of the motor.

After the brake shoes have been engaged with the drums, pressures in the master cylinder will increase and will react against the plunger 13 to move this member toward the left together with the head 100 and engage the pad 101 with the valve end 102. This phase of the operation obviously occurs when increased pressures in the master cylinder become sufficiently high to overcome the tension of the spring 104.

Throughout the remainder of the brake-applying operation, the valve end 102 will remain in contact with the pad 101. During the intermediate phase of brake operation now being considered, it will be apparent therefore that pressures in the master cylinder will be directly transmitted through plunger 13 to the valve 43 and thence through rod 84 to the brake pedal, thus providing the latter with a "feel" resistance which is directly proportional to hydraulic fluid pressures in the master cylinder, the ratio of the reaction being the ratio of the areas of the plunger 13 and sleeve 12 in the master cylinder.

It will be apparent that energization of the motor 15 will reach a maximum point beyond which it cannot be increased, whereas continued progressive brake application increases pressures in the master cylinder. Prior to full brake application, a point will be reached in which the power of the motor cannot alone move the sleeve 12 into the master cylinder, and this condition is known in the industry as the point of power "run-out." For brake application beyond such point, the operator will exert more pressure on the brake pedal, whereupon both springs 104 and 105 will be compressed and the head 100 will be moved solidly into engagement with the cap 47. This condition of operation is illustrated in Figure 2. Thereafter the power of the motor will be directly assisted by pedal pressures to move the sleeve 12 and plunger 13 as a unit up to the point of maximum brake application.

When the brake pedal is released for a retractile movement of the parts, the valve parts will assume the positions shown in Figure 3, the air groove 76 being moved completely out of registration with ports 59 and the vacuum groove being moved into registration with such ports. At the same time, the air groove 71 will be moved into communication with the ports 58. Under such conditions, the motor chamber 65 will be connected to the source of vacuum, air will be admitted into the chamber 64, and the pressure responsive unit 20 will be retracted to its off position by differential pressures rather than by balancing pressures in the motor chambers and depending upon a return spring to effect such operation. The elimination of the return spring effects a saving in the cost of a spring and eliminates a biasing force against which the pressure responsive unit in other constructions must operate at all times. The elimination of this biasing force delays the point of power "run-out" of the motor since all of the differential pressures in the motor during a brake applying operation are utilized for transmitting force to the sleeve 12. Therefore, for full brake application, the operator is called upon to exert less force upon the brake pedal during later stages of brake application.

In connection with the retractile movement of the parts, attention is invited to the fact that since this movement takes place with negligible resistance, pressure in the chamber 64 never actually approaches atmospheric pressure. Pressures in this chamber will be duplicated by providing in the chamber 57 a slightly higher pressure than in the chamber 96 which communicates with the motor chamber 65. Consequently, there will be differential pressures affecting the diaphragm 46 tending to move it toward the right. Because of the relatively free movement of the pressure responsive unit 20 and the only slightly higher pressure in the chamber 64 than in the chamber 65 required for this movement, the differential pressures affecting the diaphragm 46 will not be sufficient to overcome the tension of the springs 104 and 105. These springs, accordingly, will maintain communication between the air groove 71 and ports 58 in the retractile movement of the parts, as shown in Figure 3.

However, the expansion of the volume of the chamber 64 when the pressure responsive unit reaches the off position shown in Figure 1 will cease, and air admitted into chamber 57 will then rapidly build up pressure in such chamber and differential pressures affecting the diaphragm 46 will now move this diaphragm against the tension of springs 104 and 105 to return the valve 43 to the lap position shown in Figure 1. If pressure has built up to too great an extent in the chamber 57, the diaphragm 46 will move the valve 43 slightly to the right of the position shown in Figure 1 to "crack" the chamber 57 to the vacuum groove 70 and similarly "crack" the air groove 76 to the ports 59. Under such conditions, pressure will be lowered in the chamber 57 and raised in the chamber 96, thus lowering differential pressures affecting the diaphragm 46 to render the springs 104 and 105 effective for returning the valve to lap position. Should the pressure in chamber 96 be raised to a slightly greater extent than is necessary to render the springs 104 and 105 effective for returning the valve to lap position, the air groove 71 will be "cracked" to ports 58 and the vacuum groove 70 will be "cracked" to the ports 59. It will be apparent, therefore, that the springs 104 and 105 are so designed as to maintain the valve in what may be termed a lap position with slightly greater pressures present in the chamber 64 than in the chamber 65 to hold the pressure responsive unit in off position. Any tendency for the valve 43 to creep will result in establishing differential pressures in chambers 57 and 96 to move the valve in the proper direction to maintain the proper differential pressures in chambers 64 and 65 to hold the pressure responsive unit in off position, such differential pressures being determined by the tension of the springs 104 and 105. The slight gap referred to between the head 85 and cushion 86 provides for whatever slight movement of the valve 43 is necessary for the maintenance of the biasing pressure in motor chamber 64 to hold the pressure responsive unit in off position.

In the form of the invention shown in Figures 4, 5, and 6, a biasing differential pressure is maintained in the motor to hold the pressure responsive unit 110 in the normal off position without the use of the conventional relatively heavy biasing spring commonly used for this purpose. The operation of the valve mechanism in Figures 4, 5, and 6 is the same as in the form of the invention previously described and need not be referred to in substantial detail.

The parts normally occupy the positions shown in Figure 4. When the brake pedal is depressed, the rod 84 moves the valve 43 toward the right to admit air into the motor chamber 65 and exhaust air from the chamber 64. These motor chamber pressures will be duplicated respectively in chambers 157 and 149, and accordingly differential pressures affecting the pressure responsive unit 110 will affect the diaphragm 131 to oppose movement of the valve in direct proportion to energization of the motor.

Movement of the pressure responsive unit actuates the fluid displacing plunger 141, thus displacing fluid from the master cylinder, and the unit 110 moves relatively freely until the brake shoes are initially engaged with the brake drums. Resistance to movement of the unit 110 is then encountered, and this resistance tends to retard movement of the cap 140, ring 135 and plates 112 and 113. Such resistance, however, does not affect the diaphragm 111 outwardly of the plates 112 and 113, and this diaphragm now tends to run ahead of the plates 112 and 113, moving with it the plate 137 which is slidable on the studs 136.

It will be apparent, therefore, that the pressure responsive unit comprises relatively movable parts, and movement between such parts occurs when resistance is encountered in the displacement of fluid from the master cylinder. Movement of the plate 137 toward the right under the conditions stated causes the flange 153 of this plate to move the radially outer ends of the segments 150 toward the right. These segments fulcrum on the flange 154, and the inner ends of these segments swing toward the left and since they engage the flange 152, the member 126 will be moved toward the left to the position shown in Figure 5 with the member 126 engaging the cushion 127. Relative movement of the diaphragm 111 and its plate 137 therefore will react against the valve 43 to oppose movement thereof to an extent proportional to energization of the motor, thus providing the pedal with proportional "feel."

During the next portion of the operation, the higher pressure acting against plate 113 will transmit force through cap 140 to the fluid displacing plunger 141. Simultaneously, two additional forces will be transmitted to this plunger, namely, the force delivered by flange 153 to the lever segments 150 and the pedal forces delivered to the inner ends of these segments through flange 152. These two forces combine to transmit force through flange 154 to the ring 135 to assist in moving the plunger 141. The parts will now be in the positions shown in Figure 5.

When the power "run-out" is reached, as discussed above, additional foot pressure exerted through flange 152 against the segments 150 will rock these segments in the opposite direction, the foot pressure overcoming the now constant differential pressures delivered to the segments 150 by the flange 153. Under such conditions, the flange 143 of the diaphragm 131 will engage solidly against the washer 142, and all of the parts will now remain stationary relative to each other, and the pressure of the operator's foot on the pedal will supplement the differential motor pressures to move the plunger 141 up to the point of maximum brake application.

The retractile movement of the parts when the brake pedal is released will be similar to the retractile movement in the form of the invention previously described. When the pedal is released, the spring 144 will urge the valve 43 toward the left to connect the vacuum groove 70 to the ports 59 and connect the air groove 71 to the ports 58. Vacuum will be communicated through passages 158 and 159 to the diaphragm chamber 157. The chamber 149 will be in communication with the motor chamber 64 and air supplied to the chamber 149 will flow between studs 136 into the motor chamber 64. Thus, differential pressures will move the pressure responsive unit back to its normal position.

Inasmuch as the pressure responsive unit is freely movable, the capacity of the chamber 64 rapidly expands without establishing substantially higher pressure in such chamber than in the chamber 65, and accordingly pressure in the chamber 149 acting to the right against diaphragm 131 will not overcome the tension of the spring 144, and this spring therefore will maintain the valve 43 in a motor deenergizing position with the air groove 71 communicating to whatever extent is necessary with the ports 58 to maintain sufficiently high pressure in the chamber 64 to move the parts to the off positions shown in Figure 4. As in the previous case, the valve 43 is free to float and will maintain in the chambers 149 and 157 whatever differential pressure is necessary, in cooperation with the spring 144, to maintain the valve 43 in the proper position to maintain slightly higher pressures in the chamber 64 than in the chamber 65. Thus the parts will be held in their off positions by a slightly higher pressure in the chamber 64 than in the chamber 65, such differential pressure being determined by the tension of the spring 144.

From the foregoing, it will be apparent that the present construction provides for a rapid retractile movement of the parts and the maintenance of the parts in normal off positions without the use of the conventional relatively heavy return spring. Thus the motor is not called upon to work against the tension of such spring and a motor of given capacity will transmit more force to the fluid displacing member associated therewith prior to a run-out in power. It also will be apparent that the invention lends itself to use with separate power- and foot-operated fluid displacing members for the master cylinder, as shown in Figures 1, 2 and 3, or with a solid single fluid displacing member 141, as in Figures 4, 5, and 6. In the latter embodiment of the invention, the lever segments 150 are utilized for providing the brake with the necessary degree of "feel" and for assisting in transmitting forces to the fluid displacing member which moves into the master cylinder.

It will be apparent that in the absence of a reaction diaphragm acting on the valve against the springs urging the valve to the left, the movement of the parts to the fully off position would be followed by the establishment of atmospheric pressure in the motor chamber 64 and the vacuum of the source in chamber 65. Such reversal of energization of the motor would be operative, but would be disadvantageous. Under such conditions, an appreciable time lag would be involved in exhausting the air from the motor chamber 64 when the brakes are to be applied. The use of a reaction diaphragm opposing the springs 104 and 105 and the spring 144 limits the effectiveness of such springs for generating higher pressures in the motor chamber 64. Therefore, a reverse differential pressure is maintained only to the extent necessary to bias the pressure responsive unit to off position, and the pressure in the motor chamber 64 being only slightly higher than in the chamber 65, no appreciable time lag occurs when the pedal is operated to apply the brakes.

As is well known, very substantial force is required for a foot application of the brakes in the event of a failure of power in any booster brake mechanism. The force required is due partly to the low lever ratio of low brake pedals or treadles and partially to the fact that the operator is forced to overcome the relatively heavy return springs, which ordinarily exert a force of approximately 25 lbs. One of the important functional characteristics of both forms of the present invention lies in the fact that upon a failure of booster motor power, the operator is called upon only to overcome the friction of the parts to build up hydraulic braking pressures, the absence of the return spring referred to eliminating the necessity for the operator's having to very greatly increase the application of foot pressure in order to generate braking pressures and also to overcome the force of the return spring.

It is to be understood that the form of the invention shown and described are for the purpose of illustrating preferred embodiments of the invention and that the scope of the invention is defined in the appended claims.

I claim:

1. In a fluid motor for use with a master cylinder, said fluid motor comprising a fluid displacing member movable into the master cylinder to displace fluid therefrom, said fluid motor having a pressure responsive unit connected to said member and dividing said motor to form a pair of pressure chambers, a valve having fluid connection with said pressure chambers and with sources of relatively high and low pressures, said valve being movable in one direction from a normal position to connect said pressure chambers to the respective pressure sources to establish differential pressures in said motor to move said fluid displacing member into the master cylinder, a valve operating member, engageable with said valve to move it in said one direction and having a normal position slightly spaced from said valve when the latter is in its normal position, said valve being movable from said normal position in the other direction to reverse the connection of said pressure chambers to said sources, and means connected to bias said valve for movement from its normal position in said other direction when said valve operating member is in a normal position to reversely connect said pressure chambers to said sources and hold said unit in normal position.

2. A mechanism according to claim 1 provided with a pressure responsive device connected to said valve and carried by said pressure responsive unit and connected to be subject at opposite sides thereof to the respective pressures in said pressure chambers and opposing said biasing means to tend to limit movement of said valve in said other direction when said pressure responsive unit is in said normal position.

3. A mechanism according to claim 1 wherein said biasing means comprises a compression spring interposed between said valve and said pressure responsive unit, and a pressure responsive device comprising a diaphragm in said pressure responsive unit having control chambers at opposite sides thereof subject to pressures in said pressure chambers to oppose said spring to limit the effectiveness thereof for moving said valve in said other direction to limit the difference in pressures between said pressure chambers.

4. In a fluid motor for use with a master cylinder, said fluid motor comprising a fluid displacing member movable into the master cylinder to displace fluid therefrom, said fluid motor having a casing, a pressure responsive unit therein connected to said member and dividing said casing into a pair of chambers one of which is at the side of said unit adjacent said fluid displacing member and the other of which is at the other side of said unit, a valve sleeve carried by said unit and having spaced ports each communicating with one of said chambers, a valve slidable in said sleeve and provided with an annular groove communicating with a source of vacuum and having its ends spaced apart a distance approximately equal to the distance between the adjacent extremities of said spaced ports and approximately coinciding therewith when said unit and said valve are in normal positions, said valve being provided beyond the ends of said groove with a pair of atmospheric grooves communicating with the atmosphere whereby, upon movement of said valve in one direction from a normal position, one of said atmospheric grooves will communicate with said other motor chamber and said vacuum groove will communicate with said one motor chamber, a valve operating member engageable with said valve to move it in said one direction and having a normal position slightly spaced from said valve when the latter is in its normal position, and means connected to bias said valve for movement in the other direction from normal position to communicate between said vacuum groove and said other motor chamber and to communicate the other atmospheric groove with said one motor chamber to hold said pressure responsive unit in its normal position.

5. A mechanism according to claim 4 wherein said biasing means comprises a compression spring contacting at its ends with said pressure responsive unit and the end of said valve adjacent said one motor chamber.

6. A mechanism according to claim 4 provided with a pressure responsive device carried by said pressure responsive unit and having opposite faces subject to pressures in said chambers to act in opposition to said biasing means when pressure in said one chamber is higher than pressure in said other chamber.

7. A mechanism according to claim 4 wherein said biasing means comprises a spring contacting at one end against said pressure responsive unit and at its other end against one end of said valve to urge the latter in said other direction, and a pressure responsive device connected to said valve and carried by said pressure responsive unit and having its side opposite said one chamber subject to pressures therein and having its other side subject to pressures in said other chamber whereby, when said pressure responsive unit is in normal position and pressure in said one chamber is higher than in said other chamber, said pressure responsive device opposes said spring to limit its effectiveness for moving said valve in said other direction.

8. A mechanism according to claim 4 provided with a diaphragm in said pressure responsive unit connected to said valve and forming with said unit a pair of control chambers the first of which communicates with said one motor chamber and the second of which communicates with said other motor chamber, said baising means comprising a spring in said second chamber contacting at its ends with said diaphragm and said pressure responsive unit whereby, when pressure in said one motor chamber is higher than pressure in said other motor chamber, the pressure in said first control chamber will act against said diaphragm to oppose said spring to limit the effectiveness thereof for moving said valve in said other direction.

9. A booster brake mechanism comprising a master cylinder, a fluid displacing sleeve and a fluid displacing rod axially slidable therein and forming therewith a fluid displacing unit movable into the master cylinder to displace fluid therefrom, a fluid motor comprising a casing having a pressure responsive unit therein formed of a rigid section and a section movable relative thereto, said rigid section being fixed to said sleeve, said pressure responsive unit dividing said casing to form a pair of chambers one of which is at the side of said pressure responsive unit adjacent said fluid displacing unit and the other of which is at the other side of said pressure responsive unit, a valve having fluid connection with said chambers and with sources of relatively high and low pressures, said valve being movable in one direction from a normal position to connect said one chamber to said source of low pressure and to connect said other chamber to said source of high pressure to energize said motor and move said sleeve into the master cylinder, said valve being movable in the other direction from normal position to connect said one chamber to said source of high pressure and to connect said other chamber to said source of low pressure, a spring connected to bias said valve for movement in said other direction whereby, when said pressure responsive unit is in a normal position, higher pressure will exist in said one chamber than in said other chamber to hold said pressure responsive unit in normal position, a lost motion connection between said valve and said fluid displacing rod whereby, when said motor is energized and pressure is generated in said master cylinder, said lost motion connection will be taken up and said rod will oppose movement of said valve in said one direction, and lever means having mechanical connection with said sections and with said valve to oppose movement of said valve in said one direction in proportion to differential pressures in said chambers.

10. A mechanism according to claim 9 wherein said lever means comprises a plate divided radially to form a plurality of segmental lever elements, said rigid section having a fulcrum flange engaging said segmental levers at one side thereof, said relatively movable section and said valve being provided with annular flanges engaging the other side of said segmental levers respectively radially outwardly and inwardly of said fulcrum flange.

11. A mechanism according to claim 9 provided with a diaphragm in said rigid section connected to such section and to said valve and forming with said rigid section a pair of control chambers the first of which communicates with said one motor chamber and the other of which communicates with said other motor chamber whereby, when higher pressure exists in said one chamber than in said other chamber, said diaphragm will oppose said spring.

12. A mechanism according to claim 9 provided with a diaphragm in said rigid section connected to such section and to said valve and forming with said rigid section a pair of control chambers the first of which communicates with said one motor chamber and the other of which communicates with said other motor chamber whereby, when higher pressure exists in said one chamber than in said other chamber, said diaphragm will oppose said spring, said diaphragm axially thereof being connected to said valve and being provided with an annular flange engageable with said rigid section to limit movement of said valve in said one direction relative to sad rigid section.

13. A fluid pressure motor comprising a casing, a pressure responsive unit therein dividing said casing to form a pair of pressure chambers, a force transmitting member carried by said pressure responsive unit and projecting from said casing, a valve having fluid connection with said chambers and with sources of relatively high and low pressures, said valve having a normal position from which it is movable in one direction to connect one motor chamber to said source of low pressure and to connect the other motor chamber to said source of high pressure to move said pressure responsive unit in one direction from a normal position, a valve operating member engageable with said valve to move it in said one direction and having a normal position slightly spaced from said valve when the latter is in its normal position, said valve being movable in the other direction from said normal position to connect said one motor chamber to said source of high pressure and to connect said other motor chamber to said source of low pressure, and means connected to bias said valve for movement in said other direction from its normal position when said operating member is in its normal position to maintain a higher pressure in said one chamber than in said other chamber to hold said pressure responsive unit in said normal position.

14. A motor according to claim 13 provided within said pressure responsive unit with a pressure responsive device having opposite faces subject to pressures in said motor chambers to oppose said biasing means when said valve moves in said other direction from a normal position to limit such movement of said valve and thus limit differential pressures in said motor chambers.

15. A motor according to claim 13 provided with a diaphragm within said pressure responsive unit forming therewith a pair of control chambers one of which is at the side of said diaphragm opposite said motor chamber and communicates therewith, the other control chamber being at the other side of said diaphragm and communicating with said other motor chamber.

16. A fluid motor comprising a casing, a pressure responsive unit dividing said casing to form a first chamber and a second chamber on opposite sides thereof, said pressure responsive unit comprising a rigid section and a section axially movable relative thereto, a force transmitting member fixed to said rigid section and projecting from said casing, a valve sleeve carried by said pressure responsive unit and having longitudinally spaced ports communicating respectively with said motor chambers, a valve slidable in said sleeve and having a low pressure groove communicating with a source of relatively low pressure, said groove having its ends spaced apart a distance approximately equal to the adjacent extremities of said spaced ports, said valve being provided beyond the ends of said low pressure groove with high pressure grooves having their adjacent extremities spaced apart a distance substantially equal to the space between the remote extremities of said ports, said high pressure grooves communicating with a source of relatively high pressure, said valve being movable in one direction from a normal position to connect said low pressure groove to said first motor chamber and to connect one of said high pressure grooves to the second motor chamber to actuate said pressure responsive unit, said valve being movable in the other direction to connect said low pressure groove to said second motor chamber and to connect the other high pressure groove to said first chamber to establish higher pressure in said first chamber than in said second chamber to hold said pressure responsive unit in a normal position, means connected to bias said valve for movement in said other direction, and lever means having mechanical engagement with said sections and with said valve whereby resistance to movement of said force transmitting member transmits through said lever means to said valve a reaction force tending to oppose movement of said valve in said one direction.

References Cited in the file of this patent

UNITED STATES PATENTS

| | | |
|---|---|---|
| 2,006,487 | Sorensen | July 2, 1935 |
| 2,421,726 | Thomas | June 3, 1947 |
| 2,475,105 | Mitton | July 5, 1949 |
| 2,685,170 | Price | Aug. 3, 1954 |
| 2,690,740 | Hupp | Oct. 5, 1954 |